Oct. 28, 1969  MAKOTO NAKAMURA  3,474,715
DEVICE FOR ELEVATING AND LOWERING THE REFLECTING MIRROR OF
SINGLE LENS REFLEX CAMERAS
Filed May 18, 1967
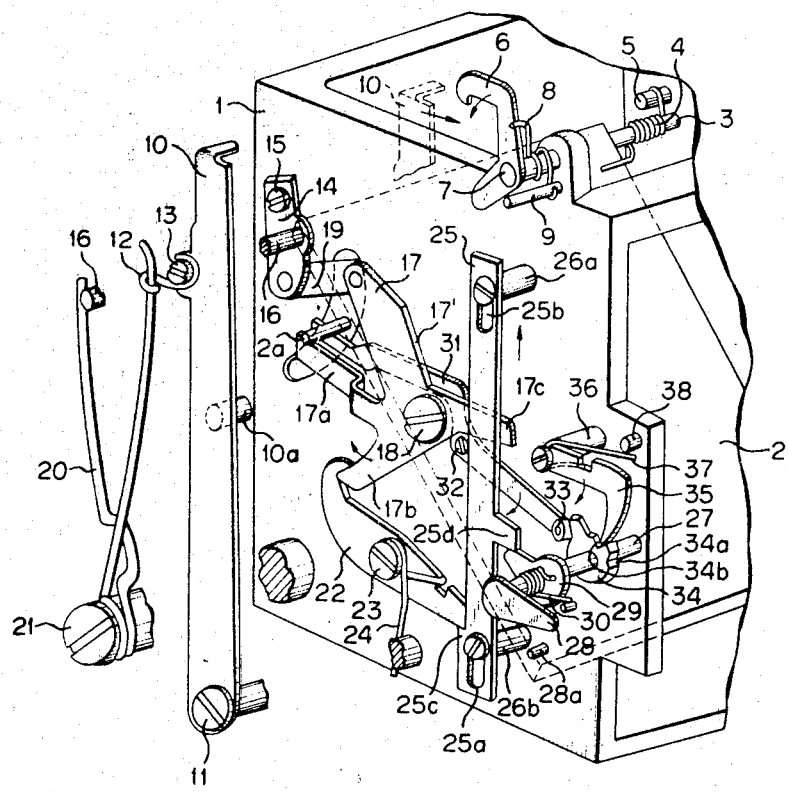

United States Patent Office 3,474,715
Patented Oct. 28, 1969

3,474,715
DEVICE FOR ELEVATING AND LOWERING THE REFLECTING MIRROR OF SINGLE LENS REFLEX CAMERAS
Makoto Nakamura, Tokyo, Japan, assignor to Nippon Kogaku K.K., Tokyo, Japan, a corporation of Japan
Filed May 18, 1967, Ser. No. 639,581
Int. Cl. G03b 19/12
U.S. Cl. 95—42                              6 Claims

ABSTRACT OF THE DISCLOSURE

A device for elevating and lowering the mirror of a single lens reflex camera where three operations for moving the mirror may be performed by one mechanism. The three operations are; first, the socalled quick return type of operation interlocked to the operation of the shutter portion; second, hand operation regardless of the operation of the shutter portion; and third, the lowering operation is interlocked with the operation of the shutter portion, but the elevating operation is done manually.

---

This invention relates to a device for elevating and lowering the reflecting mirror of single lens reflex cameras. In a single lens reflex camera, it is desirious that the up-and-down movement of the reflecting mirror can be carried out by the following three operations.

(a) For conveniently making ordinary photographs, the movement of the reflecting mirror is carried out by the quick return operation interlocked to the operation of the shutter portion;

(b) For enabling the adoption of an exchangeable lens such as a super wide angle lens having a short back focus of which the rear and portion being significantly projected; or for conveniently making a photograph when no vibration due to mirror operation is desirable, or when making rapid sequence photographs without use of the viewfinder, the movement of the mirror is carried out manually without being interlocked with the operation of the shutter portion.

(c) For satisfying the requirement, especially in microscopic photography, that no vibration occurs when the mirror is in its elevating movement but it is desirious to observe, after phototaking, the object under observation as quickly as possible, the elevating operation of the mirror is carried out manually but the lowering operation of the mirror is carried out in interlocking with the operation of the shutter portion.

Each of the above mentioned operations per se has been known in the art, however, the novel feature of the present invention is to combine these three operations into one mechanism and any of the operations can selectively be made by the operation of a single handle.

The objects and the advantages of the present invention will be more apparent by the following explanations referring to an illustrative embodiment shown in the drawing wherein an embodiment of the present invention is shown explanatorily and a portion of which is broken away to show the essential structure.

In the drawing, 1 is a base box within which the device for moving up and down a movable reflecting mirror 2 of a single lens reflex camera is housed, 2a is a pin fixed on the side surface of the mirror 2, 3 is a shaft for rotatably supporting the mirror 2, 4 is a spring for biasing the mirror 2 to return the same to its lowered position, 5 is a pin fixed on the side wall of the box 1 and one end of the spring 4 is held by the pin 5, 6 is a hook lever rotatably supported by a shaft 7 projected from the box 1, the lever 6 being so constructed that when a charge lever 10, about which is explained later, is engaged with the lever 6, the reversal movement of the lever 10 is prevented. A spring 8 is a biasing spring to normally rotate the lever 6 in an anticlockwise direction as shown by an arrow in the drawing, and 9 is a control pin. The charge lever 10, one end of which being rotatably supported by a shaft 11 which is fixed to and projected from the box 1, is constructed such that it is rotated clockwise, as shown by an arrow in the drawing, to be engaged with the hook lever 6, in interlocking with the film winding up operation of the conventional film wind mechanism (not shown). A pin 10a is fixed on the back surface of the lever 10 for returning the lever 17. The pin 10a will contact with a side surface of an upper arm of a quick return or driving lever 17, described hereinafter, when the mirror 2 is in its elevated position, for transmitting the reversal movement of the lever 10 to the quick return driving lever 17. An element 12 is a hook member rockably mounted on the lever 10 by a pin 13 fixed on the lever 10, 14 is a lever rotatably supported by a shaft 15 fixed on the box 1, and at the center of the lever 14 is a pin 16 for receiving a spring 20, which is described hereinafter.

The quick return driving lever 17 is a mirror driving lever rotatably supported by a shaft 18 fixed to the box 1, and the left arm 17a thereof is engaged by the pin 2a, and the lower arm 17b thereof is engageable by a detent 22, which is described hereinafter, and at the same time the right supporting arm 17c thereof is interlocked to the conventional stop mechanism (not shown), and the lever 17 and the lever 14 are connected by a connecting lever 19. The main spring 20 is wound on the supporting shaft 21, and both ends thereof are stopped by the pin 16 and the hook member 12 respectively, and it is so devised that the movement of the lever 10 is transmitted to the lever 14. The detent 22 is rotatably provided on the box 1 through a shaft 23 fixed to the box 1, one end of which being engageable with the lower arm 17b of the quick return lever 17, and the other end of which being abutted against a notch 25c of a quick return initiating lever 25, which is described hereinafter, and the detent 22 is normally biased to rotate in the clockwise direction by a spring 24. The lever 25 has a pair of grooves 25a and 25b at the lower and upper ends, respectively, into which the respective guide pins 26a and 26b, both of which being fixed to the box 1 are inserted so that the lever 25 is slidable along the line connecting grooves 25a and 25b as shown by an arrow in the drawing, and the lever 25 plays a role of initiating the quick return mechanism. The notch 25c is provided at the lower portion of the lever 25 and is engaged by the detent 22. The lever 25 has at its middle portion a projection 25d to be engageable with a first small lever 29, which is described hereinafter, and the lever 25 is slidable in an arrow direction, i.e. upwardly, in interlocking with the operation of the conventional shutter mechanism (not shown), when the shutter release is made, and the lever 25 is so devised that, in its most elevated position, the top end of which pushes the hook lever 6 to rotate the latter clockwise to release the engagement of the lever 10.

An element 27 is a handle saft rotatably provided at the box 1, 28 is an operational handle fixed to the shaft 27, on which the first small lever 29 and a second small lever 34, described hereinafter, are mounted. The first small lever 29 abuts with the projection 25d so as to manually operate only the elevating action of the reflecting mirror 2 when the handle 28 is manually operated to rotate in clockwise direction. A pin 28a plays a role of stopping the rotation of the handle 28 and a spring 30 normally biases the handle 28 to return the latter to its initial horizontal position, and 31 is a lever rotatably mounted on a shaft 32 fixed to the box 1 in parallel with the driving lever 17, one end of the lever 31 abutting to the pin 2a and the other end thereof being provided with a roller 33. The second small lever 34 is fixedly mounted on the shaft 27 and engageable by the roller 33 of the lever 31 for manually controlling the up-and-down movement of the mirror 2 by the operation of the handle 28 without relationship with the quick return mechanism for the mirror 2, and 34a is a click notch provided on the lever 34 for maintaining the mirror at its elevated position. A detent 35 is rotatably mounted on a shaft 36 fixed to the box 1 and biased clockwise by a spring 37 of which one end is received by a pin 38 fixed on the box 1.

The following is the explanation of the three operations of the hereinbefore described mechanism of the present invention. First, when the reflecting mirror is subjected to an automatic quick return motion, the handle 28 is set at the position shown in the drawing. The conventional film winding lever (not shown) is rotated for film winding, then the action is transmitted to the charge lever 10 to rotate the charge lever 10 in the clockwise direction to charge the main spring 20 until the lever 10 is engaged to the hook lever 6. When the shutter button (not shown) is operated to release the shutter mechanism, the lever 25 of the quick return mechanism starts to elevate, being interlocked with the shutter mechanism. When the lever 25 goes upwardly, the notch 25c pushes the click stopper 22 to rotate the latter in an anticlockwise direction to release the quick driving lever 17, which in turn rotates in a clockwise direction by the stored energy of the main spring 20 through the pin 16, levers 14 and 19 to elevate the mirror 2 through the pin 2a. And upon completion of the shutter action, the lever 25 by a conventional means further elevates the lever 25 to push the hook lever 6 to release the charge lever 10 to allow its reversal movement by means of the remaining stored energy of the main spring 20. Then the pin 10a pushes the side surface 17' of the upper arm of the quick return driving lever 17 to rotate the latter anticlockwise direction to restore to its original position. And at the same time, the mirror 2 returns to its lowered position with the aid of the spring 4 to complete one cycle of the so-called quick return operation.

Second, when the reflecting mirror 2 is manually elevated and lowered by the operation only the handle 28, the mechanism of the present invention is operated independently of the shutter mechanism and the film winding mechanism. The handle 28 is rotated in an anticlockwise direction to rotate the second small lever 34 along therewith. The lever 34 pushes the roller 33 to rotate the lever 31 in clockwise direction, then the lever 31 pushes up the pin 2a to elevate the mirror 2 to its elevated position. At this time the detent 35 engages with the click groove 34a to hold the mirror at its elevated position. When the handle 28 is returned to its horizontal position, the detent 35 disengages from the groove 34a and engages with the original groove 34b, and the mirror returns to its lowered position with the aid of the spring 4.

Third, when the reflecting mirror 2 is elevated manually, but is lowered interlocked with the shutter mechanism, the mechanism of the present invention is operated as follows:

As in the first operation, the charge lever 10 is rotated clockwise until it is engaged with the hook lever 6 to energize the main spring 20. At this state, the handle 28 is rotated clockwise until the movement is stopped by the stopper pin 28a, thus the first small lever 29 rotates to elevate the lever 25 with the aid of the projection 25d so that the detent 22 is rotated anticlockwise to release the lever 17 to allow the mirror 2 to elevate by the stored energy of the main spring 20. And consequently, at this state, when the shutter is released, the lever 25 is further elevated as aforementioned, and the mirror quickly returns to its lowered position.

The present invention is not restricted to the embodiment shown in the drawing and other modifications can be easily devised. For example, the first small lever 29 can be directly associated with the click stopper 22, or the first and second small levers can be formed of the same member.

As described above, in accordance with the invention, any one of the three operations can be selectively carried out. Any one of the three operations may be selected according to the object to be photographed, or to the type of photography, there being very little possibility of preexposing or skipping a film frame as in conventional mechanisms when the switching operation is made between the quick return and the manual operations.

What is claimed is:

1. A device for elevating and lowering a reflecting mirror of single lense reflex cameras comprising a quick return mechanism for the reflecting mirror, a driving lever provided in the quick return mechanism, means for biasing the reflecting mirror, the mirror being elevated by the action of the driving lever and lowered with the aid of the biasing means as the driving lever returns to its original position, a manually operable lever provided in parallel with the driving lever, a first and second small levers mounted on a handle shaft operable from outside of the camera, the two small levers having opposed rotational directions to each other and the first lever being associated with a lever initiating the quick return operation of the mirror, and the second lever being associated with one of the manually operable levers, the operational range of the initiating lever by means of the first lever being restricted to the elevating operation of the mirror by the quick return mechanism.

2. A device for elevating and lowering a reflecting mirror of a single lens reflex camera, comprising
   a quick return mechanism for the reflecting mirror charged by the film advancing mechanism of the camera,
   a driving lever in the return mechanism for elevating the mirror,
   means for biasing the mirror to its lowered position,
   a quick return initiating lever movable from an initial position to a mirror return initiating position upon release of the shutter mechanism of the camera,
   a pivoted lever for the mirror,
   a manually operable lever movable from an initial position to a first and to a second position, and
   a first lever cooperating with the return initiating lever and a second lever cooperating with the mirror lever, both the first and second levers being movable by the manually operable lever, movement of the manually operable lever from its initial position to its first position moving the initiating lever through the first lever to permit elevation of the mirror by the driving lever, movement of the manually operable lever from its initial position to its second position moving the mirror lever to elevate the mirror, the return of the manually operable lever to its initial position from its second position lowering the mirror.

3. A device according to claim 2, wherein a detent is provided for the second lever to hold the second lever in the second position of the manually operable lever to hold the mirror elevated.

4. A device according to claim 3, wherein the manually operable lever, the first lever and the second lever are secured on a shaft with the manually operable lever outside the camera, the initial position of the manually operable lever being intermediate the first and second positions.

5. A device according to claim 3, wherein a second detent interconnects the return initiating lever and the driving lever, movement of the initiating lever from its initial position releasing the detent to permit the driving lever to elevate the mirror, movement of the manually operable lever to its first position moving the initiating lever to release the second detent to permit the driving lever to elevate the mirror.

6. A device according to claim 2, wherein the manually operable lever, the first lever and the second lever are secured to a rotatable shaft, the initial position of the manually operable lever being intermediate the first and second positions, resilient means for rotating the shaft and its levers to the initial position from the first and second positions, a detent for the second lever to hold the second lever in the second position of the manually operable lever for holding the mirror elevated, and a second detent interconnecting the return initiating lever and the driving lever, movement of the initiating lever from its initial position releasing the detent to permit the driving lever to elevate the mirror, rotation of the manually operable lever to its first position moving the initiating lever to release the second detent to permit the driving lever to elevate the mirror.

References Cited

UNITED STATES PATENTS 3,319,551   5/1967   Ettischer et al. _____ 95—42

NORTON ANSHER, Primary Examiner

R. L. MOSES, Assistant Examiner